United States Patent [19]

Knoess et al.

[11] Patent Number: 5,096,037
[45] Date of Patent: Mar. 17, 1992

[54] GEARSHIFTING OR SLIDING SLEEVE FOR AUTOMOBILE TRANSMISSIONS AND A MANUFACTURING PROCESS

[75] Inventors: Walter Knoess, Fussen; Ulrich Wollenteit, Munich, both of Fed. Rep. of Germany

[73] Assignee: Sinterstahl Gesellschaft, Fuessen, Fed. Rep. of Germany

[21] Appl. No.: 489,209

[22] Filed: Mar. 6, 1990

[30] Foreign Application Priority Data

Mar. 18, 1989 [DE] Fed. Rep. of Germany ...... 3908989

[51] Int. Cl.$^5$ .............................................. F16D 13/60
[52] U.S. Cl. .............................. 192/114 T; 192/53 F; 29/893.3; 29/463; 29/469
[58] Field of Search ............ 29/893.3, 893.34, 893.35, 29/893.36, 463, 469; 192/53 F, 114 T

[56] References Cited

U.S. PATENT DOCUMENTS 1,647,136 11/1927 Johnson .
2,908,366 10/1959 Altmann ............................. 192/53
4,019,586 4/1977 Hauser .
4,181,210 1/1980 Bibbens ........................... 192/114 T

FOREIGN PATENT DOCUMENTS 2511460 9/1976 Fed. Rep. of Germany .
1138203 6/1957 France .
1204641 4/1969 United Kingdom .

OTHER PUBLICATIONS

E. Brugel, "Synchronization, an Important Design Element of our Shifting Transmission", ZF Ring, issue 1 (1988).

Primary Examiner—P. W. Echols
Attorney, Agent, or Firm—Morgan & Finnegan

[57] ABSTRACT

A process is provided for the manufacture of a gearshifting or sliding sleeve for the forced synchronization of manually shifted automotive transmissions in which the sleeve is manufactured in the form of two substantially symmetrical partial units and is then processed further into a complete sleeve by means of customary joining methods. This process permits sleeves to be manufactured by means of comparatively low-cost powder metallurgical methods through pressing and sintering, and thus makes it possible to dispense with very cost-intensive machining methods.

9 Claims, 1 Drawing Sheet

GEARSHIFTING OR SLIDING SLEEVE FOR AUTOMOBILE TRANSMISSIONS AND A MANUFACTURING PROCESS

FIELD OF THE INVENTION

The present invention relates to a process for manufacturing a gearshifting or sliding sleeve for the forced synchronization of manually shifted automotive transmissions. The sleeve features a sleeve design which is substantially symmetrical with respect to a plane at right angles to the sleeve axis, and a gear tooth system on the inside surface of the sleeve which, when viewed along the axis, has tooth sections that taper down in the direction of the plane of symmetry.

BACKGROUND OF THE INVENTION

At present, manually shifted automotive transmissions operate primarily on the principle of forced synchronization. The shifting action establishes a positive connection between the main transmission shaft and the respective gear wheel. The positive connection between the elements is ultimately attained by means of a gearshifting or sliding sleeve, aided by various synchronization elements.

Gearshifting or sliding sleeves carry a gear-tooth system of complex design on the inside surface of the sleeve. As is well known, the synchronization process involves first bringing the inside gear teeth of the sliding sleeve in contact with the locking gear of a synchronization ring, and then, as synchronization proceeds, pushing them through the locking gear into a claw gearing of the gear wheel. This ends the gear shifting process. In order to ensure that the gearing as described will not disconnect, particularly under load changes in a particular gear, the gearing of the inside sleeve surface, among others, is also fitted with undercut tooth flank sections which, when viewed along the axis of the sleeve, taper down toward the inside in the direction of the plane of symmetry.

As a normal practice in the design of automotive transmissions, a gearshifting sleeve is used to engage two gears on one shaft by means of shifting it either to the left or to the right, so that for this reason alone it is logical to design the gearshifting sleeve symmetrically with respect to a central plane at right angles with the sleeve axis. Minor differences in design between the left and right half-sleeves usually occur when, for instance, a gearshifting sleeve is used to engage one forward and one reverse gear.

Synchronization in shifting transmissions along with the design elements and techniques used for this purpose are described in more detail in, for example, the article "Synchronization, an Important Design Element of our Shifting Transmissions" by Dipl. Ing. E. Brugel in the German periodical "ZF Ring" (1988), issue 1.

Due to the design requirements mentioned above, gearshifting sleeves can so far only be produced from a ring-shaped blank by means of very involved and expensive machining methods. As an alternative, the special gear-tooth profiles are manufactured by an initial machining operation in a preliminary stage, followed by undercut rolling.

The manufacture of a gearshifting or sliding sleeve represents a significant cost factor in producing a transmission. Consequently, continuing efforts have been made to reduce manufacturing costs for this unit. Some of these efforts have culminated in patents. However, it has so far not been possible to abandon the method of expensive inside machining for producing the special gear-tooth system in gearshifting or sliding sleeves.

OBJECTS OF THE INVENTION

It is therefore an object of the present invention to develop a less costly process for the manufacture of gearshifting or sliding sleeves of the type heretofore described.

It is another object of the invention to avoid the involved machining techniques that have been required in the manufacture of gearshifting or sliding sleeves.

A further object of the invention is to provide a sliding sleeve for the forced synchronization of manually shifted automotive transmissions which can be produced economically.

SUMMARY OF THE INVENTION

The objective of the invention is achieved by means of a process for the manufacture of a gearshifting or sliding sleeve for the forced synchronization of manually shifted automotive transmissions, which involves separately manufacturing two symmetrical construction elements as partial units, and then subsequently combining the elements together by joining. The sleeve so produced is substantially symmetrical with respect to a plane at right angles to the sleeve axis. The sleeve has a gear-tooth system on the inside surface which, when viewed along the axis, has tooth sections that taper down in the direction of the plane of symmetry.

This process permits sleeves to be manufactured for the first time by means of comparatively low-cost primary shaping methods, such as powder metallurgical methods through pressing and sintering, or by means of casting followed by mechanical processing.

Also provided as part of the invention is a gearshifting or sliding sleeve produced according to the above-described process.

DETAILED DESCRIPTION OF THE PREFERRED EMBODIMENTS

Figure 1:
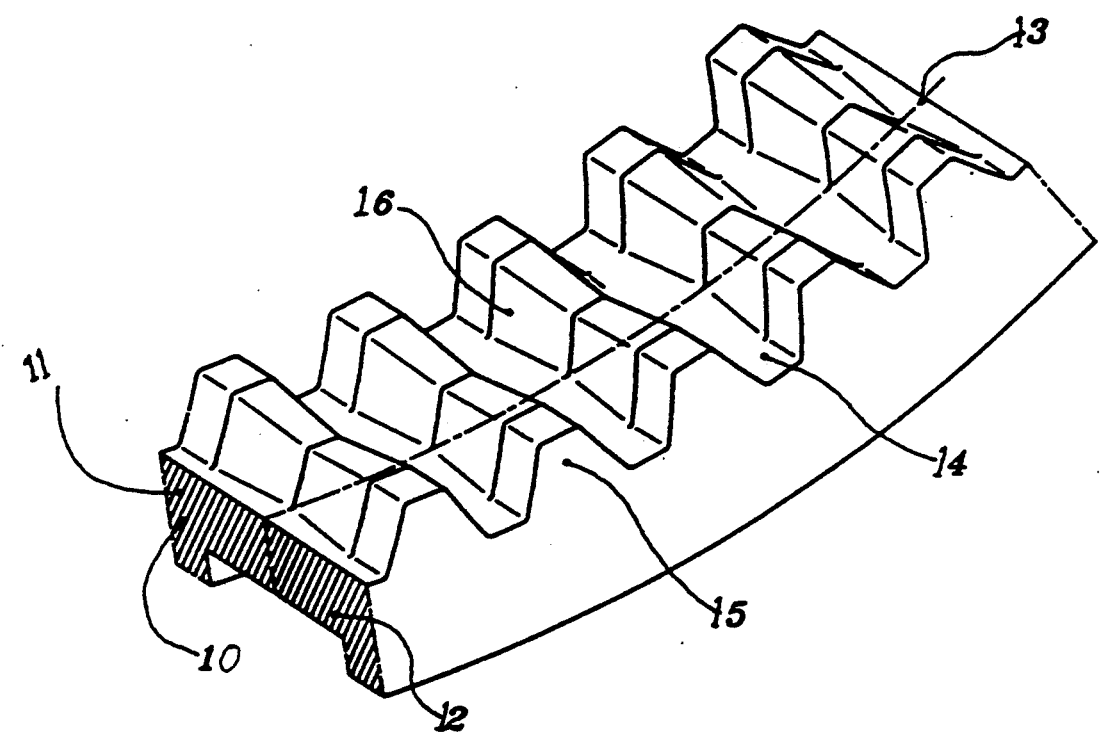
FIG. 1 is a plan view of a gearshifting or sliding sleeve produced according to the present invention.

The process according to the present invention involves separately manufacturing two partial units forming the two substantially symmetrical elements of the sleeve, and subsequently joining the partial units into a complete gearshifting or sliding sleeve.

This process permits the use of primary shaping methods for manufacturing the partial elements, such as powder pressing and sintering, or casting, which at present can be carried out with great precision. Other suitable methods for producing the interior gearing, starting from a blank, are precision reshaping methods such as precision forging and cold-flow pressing.

Many different joining methods, which in themselves are already known in the art, can be applied for joining the two partial units into a complete gearshifting or sliding sleeve. This is especially true since the joint between the partial units must transmit only comparatively low mechanical forces between the partial units. After shifting, the transfer of forces between the main transmission shaft and the gear wheel always remains confined within an individual symmetry area of the complete gearshifting or sliding sleeve, so that the joint itself remains load-free.

In view of the geometric design of currently utilized gearshifting or sliding sleeves, joining by means of friction welding has proven as effective as flash butt welding or the so-called "rotation arc method". If the weld seam is properly prepared, welding by electron or laser beam is also a preferred method.

Soldering methods can be used for joining as well, particularly in conjunction with the sintering of parts made by powder metallurgy. Gluing methods are gaining in importance among joining methods for metal parts as well.

Depending on the joining technique to be applied, the parts to be joined are either butt-jointed or are placed on each other with friction or form locking. The contact surfaces can therefore be flat surfaces, serrated surfaces, or, for instance, step-shaped circular surfaces.

The process described herein is not limited to the use of any particular materials.

Referring now to FIG. 1, there is shown a plan view of a sliding sleeve 10 produced according to the present invention. FIG. 1 shows the plane of symmetry 13, along which the two symmetrical partial units 11 and 12 are joined together after having been manufactured separately. The sleeve carries a ring gear 15 on its interior surface 14. The tapering-off of individual tooth sections 16 in the direction of the plane of symmetry is also made visible.

In view of the above-mentioned processes for manufacturing gearshifting or sliding sleeve according to the present invention, machining methods will lose importance. Since the partial units can be manufactured according to the invention without the particularly expensive, technically involved production of undercut tooth flanks, manufacturing costs for machining operations will in the future also be subject to substantial reduction, so that even by machining the partial units and subsequent joining, substantial cost advantages can be gained compared to the present state of technology.

EXAMPLE

The invention is described in more detail through the following example, which in no way should be construed as limiting the scope of the invention:

The gearshifting or sliding sleeve with features similar to FIG. 1 is manufactured from an iron alloy powder having a composition in accordance with DIN standard proposal SINT D 37 and a mean particle size of about 75 um. The powder is pressed into a blank in hydraulic presses having movable upper and lower dies. The blank is sintered for about 0.5 hours in a continuous sintering furnace at various temperature levels between about 1120° C. and about 1300° C. The unit made in this manner is then recalibrated in a hydraulic press and surface-hardened if desired.

Using these process steps, the strength values, tolerances and surface qualities demanded in transmission technology can be attained. The two partial units are subsequently mounted in a commercial welding unit and are joined together by means of friction welding.

The invention in its broader aspects is not limited to the specific embodiments herein shown and described but departures may be made therefrom within the scope of the accompanying claims, without departing from the principals of the invention and without sacrificing its chief advantages.

What is claimed is:

1. A process for the manufacture of a gearshifting or sliding sleeve of the forced synchronization of manually shifted automotive transmission, comprising:
   separately manufacturing two symmetrical construction elements as partial unit; and
   subsequently combining said elements together by metallurgically joining so as to form a sleeve which is substantially symmetrical with respect to a plane at right angles to the sleeve axis, said sleeve having a gear-tooth system on the inside surface which, when viewed along said axis, has tooth sections that taper down in the direction of said plane of symmetry, said tapers meeting at the plane of symmetry.

2. A process for manufacturing a gearshifting or sliding sleeve as claimed in claim 1, wherein said partial units are manufactured by means of powder metallurgical methods through pressing and sintering.

3. A process for manufacturing a gearshifting or siding sleeve as claimed in claim 1, wherein said partial units are manufactured by means of casting followed by mechanical processing.

4. A process for manufacturing a gearshifting or sliding sleeve as claimed in claim 1, wherein said partial units are manufactured by means of precision forging.

5. A process for manufacturing a gearshifting or sliding sleeve as claimed in claim 1, wherein said partial units are joined together by means of friction welding.

6. A process for manufacturing a gearshifting or sliding sleeve as claimed in claim 1, wherein said partial units are joined together by means of laser beam welding.

7. A process for manufacturing a gearshifting or sliding sleeve as claimed in claim 1, wherein said partial units are glued together through a serrated contact surface.

8. A process for the manufacture of a gearshifting or sliding sleeve as claimed in claim 1 wherein said tooth sections taper axially in the direction of said plane of symmetry such that one end of tooth sections closer to the plane of symmetry is narrower than the other end of the tooth sections farther from the plane of symmetry.

9. A sliding sleeve for the forced synchronization of manually shifted automotive transmissions comprising two symmetrical construction elements which are manufactured separately as partial units and are subsequently combined together by joining, said sleeve being substantially symmetrical with respect to a plane at right angles to the sleeve axis and having a gear-tooth system on the inside surface thereof which, when viewed along said axis, has tooth sections that taper down in the direction of said plane of symmetry, said tapers meeting at the plane of symmetry.

* * * * *

UNITED STATES PATENT AND TRADEMARK OFFICE
CERTIFICATE OF CORRECTION

PATENT NO. : 5,096,037

DATED : March 17, 1992

INVENTOR(S) : Walter Knoess, et al.

It is certified that error appears in the above-identified patent and that said Letters Patent is hereby corrected as shown below:

In Claim 7, column 4, line 43, after "surface" add--in a locking position--.

Signed and Sealed this

Thirty-first Day of August, 1993

Attest:

BRUCE LEHMAN

Attesting Officer  Commissioner of Patents and Trademarks